(12) United States Patent
Podhola

(10) Patent No.: US 12,044,865 B2
(45) Date of Patent: Jul. 23, 2024

(54) LIQUID CRYSTAL SYSTEM DISPLAY FOR STEREOVISION

(71) Applicant: Kamil Podhola, Liberec (CH)

(72) Inventor: Kamil Podhola, Liberec (CH)

( * ) Notice: Subject to any disclaimer, the term of this patent is extended or adjusted under 35 U.S.C. 154(b) by 173 days.

(21) Appl. No.: 17/722,322

(22) Filed: Apr. 16, 2022

(65) Prior Publication Data

US 2023/0333403 A1 Oct. 19, 2023

(51) Int. Cl.
*G02B 30/28* (2020.01)
*G02F 1/29* (2006.01)
*G03B 35/08* (2021.01)

(52) U.S. Cl.
CPC ............. *G02B 30/28* (2020.01); *G02F 1/294* (2021.01); *G03B 35/08* (2013.01)

(58) Field of Classification Search
CPC ....................................................... G02F 1/294
See application file for complete search history.

(56) References Cited

U.S. PATENT DOCUMENTS

| | | | | |
|---|---|---|---|---|
| 8,451,390 | B2 * | 5/2013 | Furukawa | G02B 30/25 |
| | | | | 353/30 |
| 2010/0026787 | A1 * | 2/2010 | Yasuda | H04N 13/332 |
| | | | | 348/47 |
| 2016/0262608 | A1 * | 9/2016 | Krueger | G16H 40/63 |
| 2017/0118460 | A1 * | 4/2017 | Basler | G09G 3/3413 |

\* cited by examiner

*Primary Examiner* — Edmond C Lau

(57) ABSTRACT

The invention relates to a liquid crystal display (LCD) system for stereovision comprising a liquid crystal panel including at least two light tunnels where a driver circuit can pick up any of the light tunnel and direct light towards any of a viewer's eye. The LCD system may comprise pixel route columns, liquid crystal active lenses which may comprise a curved alignment layer, central and peripheral electrodes, three-dimensional electrodes and/or side wall electrodes and which may provide vantage zones. The liquid crystal lenses can have cylindrical or prismatic shapes. Stereovision may be provided in more vision positions. The system may provide monovision. The system may comprise a wiever position sensor, may be flexible and may comprise diagonally arranged pixel/subpixel routes and/or provide diagonally polarized light. The invention further relates to a photo/video camera system for the provided stereovision LCD and to a method for providing an LCD based stereovision.

17 Claims, 9 Drawing Sheets

FIG. 1
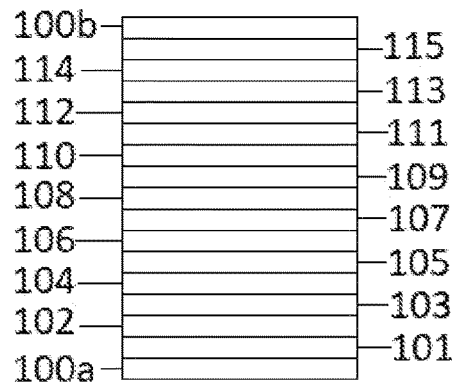
FIG. 2
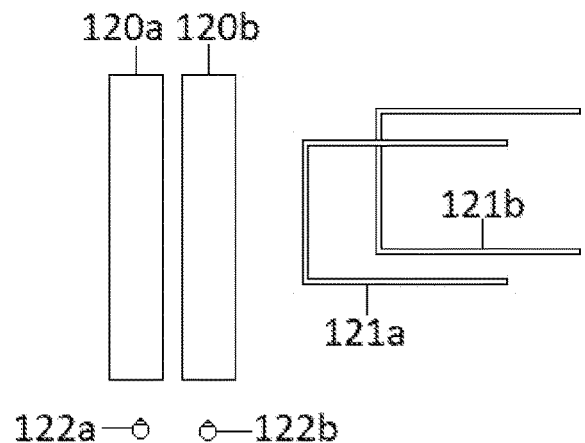
FIG. 3a  FIG. 3b  FIG. 4  FIG. 5
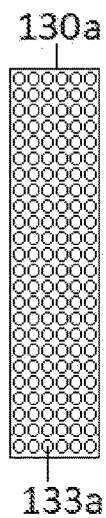 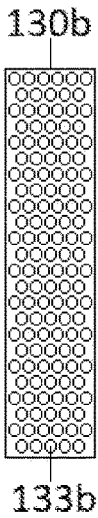 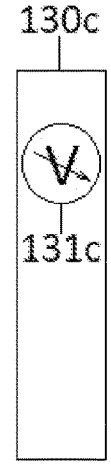 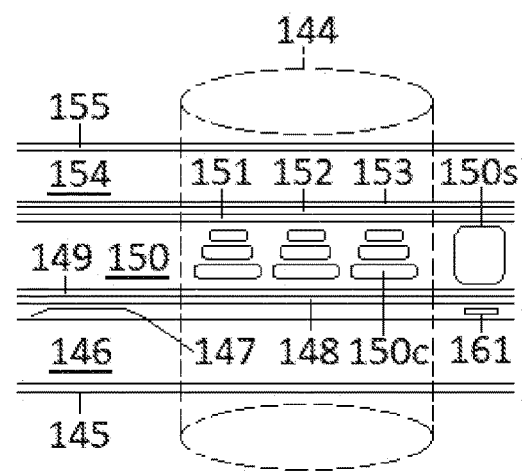
FIG. 6  FIG. 7a  FIG. 7b  FIG. 7c  FIG. 8
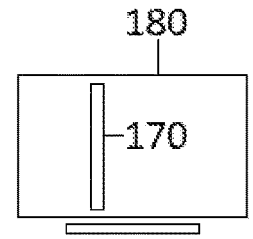 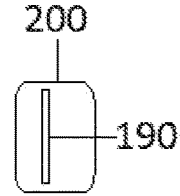 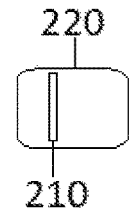 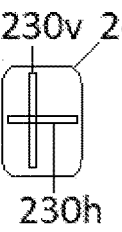 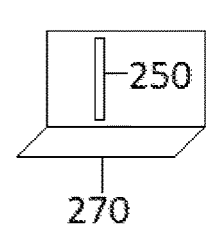
FIG. 9  FIG. 10  FIG. 11
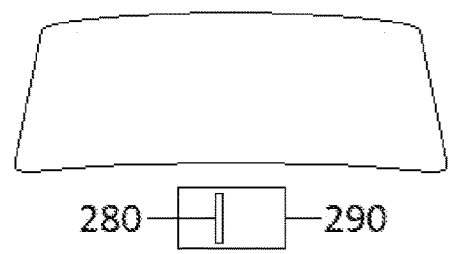 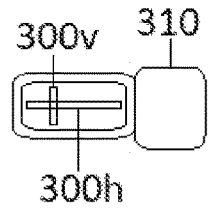 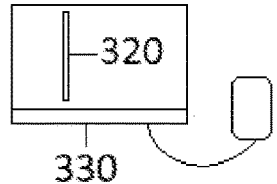

1627a 1627b 1637a 1637b 1627c 1627d 1637c 1637d

1640

1650  1650a 1650b 1660 1660a 1660b 1670 1673
1690a
1680

1690b

1680

1720
1710

1700
1693

LIQUID CRYSTAL SYSTEM DISPLAY FOR STEREOVISION

TECHNICAL FIELD

The invention relates to a liquid crystal display (LCD) system for stereovision.

BACKGROUND ART

There is a wide range of liquid crystal display systems which can be used in photonics products such as displays for televisions, computers and mobile phones. A typical liquid crystal (LC) device consists of a thin LC layer sandwiched between a pair of plane substrates (e.g. glass substrates or plastic substrates). Conventionally, three-dimensional displays of images have been achieved by using stereoscopic displays combining two two-dimensional views. Each view is observed by one of the viewer's eyes and the two views are subsequently integrated by the human visual system to form a three-dimensional (3-D) image as perceived by the viewer, through the display.

For stereoscopic display technologies a special eyewear, e.g. polarized or filtered glasses can be used.

Autostereoscopic display approaches can include holography, volumetric imaging, multiple-image techniques (e.g. integral imaging), parallax barriers, and lenticular lens arrays. Systems can alternately generate light emitting lines on the display representing interlaced left and right eye images and respectively directing the interlaced left and right images to a viewer's left and right eyes. e.g. by means of lenses positioned in alignment with display picture elements.

Problems to be solved regarding lenticular arrays can be moiré effect, imbalance between horizontal and vertical resolutions, image distortion, misalignment of cylindrical lenses or arrays.

Some systems use eye-tracking and some systems watching points or zones (feasible regions). The systems without a special eyewear are mostly single-viewer 3D television and personal computer systems.

Color displays are normally constructed with pixels having a plurality of color elements such as red, green, and blue (e.g. 2G:1R:1B) or cyan, magenta and yellow arranged alongside each other along a generally horizontal line of the display relative to a position of intended use. There can be other possibilities, for example, red and green orienting dyes can be combined in a single polarizing color filter, thereby creating pixels that have two sub-pixels rather than three. The pixels can thus be made smaller, increasing the overall display resolution. A focal axis of a typical lens is vertical and thus the point focus in a color display where color elements are vertically aligned would be on only one color at a time. Some systems have rotated the display 90 degrees or have used more than one lenticular layer or have used lenses with a diagonal focus which have transposed a vertical focal orientations of all color elements associated with a pixel into a horizontal and color elements have been brought into focus despite eventual vertical alignment of color subpixel elements. Free form lenses and gray scale technology has been used to avoid color distortion (e.g. rotated cylindrical lens with a rotated focal axis). Lens arrays have been formed from a suitably translucent material etched using grayscale Deep Reactive Ion Etching (DRIE) or etched directly into the surface of materials associated with a display. Radius of curvature of the lenses could have been controlled to blur out the image of the gap between the pixels. An overlap on the light from the pixels should not exceed 30%. A correspondence of pixels to lenses has preferably been two pixels for each microlens or lens element in the lenslet array. By altering the number of lenses per pixel, a desired screen resolution may be achieved which produces images of improved quality. The number of lenses or apertures per pixel can be selected to achieve oversampling.

Various layouts of lenslet arrays has been presented (e.g. vertically or horizontally shifted, etc.). An appropriate pitch for lenses (microlenses) within a lenticular array of the display may be calculated depending on both the distance between a viewer and the lenticular array located at the front of a pixel array and a separation between pixel arrays and lens arrays which can be determined based on various criteria, such as the size and/or appearance of the resulting display, focal length of the lenses, etc. An alignment between an eye bisector, a center of lens within a lenticular array and a center of pixel groups has been preferably achieved at a central point of an autostereoscopic display. An offset between the center of lenses and their corresponding pixel columns have been increased as the distance from central lens has increased. Left (right) eye typically perceives an image created by visually joining all pixel columns associated with that eye. The left and right eye views have been projected to the left and right of an imaginary dividing line. A resolution of a mono or stereoscopic display is related to the number of pixels each having at least two subpixel (e.g. color) elements or at least a triplet of red, green and blue subpixels. Pixels has been generally extending horizontally when viewed. Approximately 30% of linear dimension along between the RGB triplets in the horizontal direction is dead space. That is, no light is emitted from these areas. Approximately 10% of the linear dimension in the vertical direction is dead space.

An approximate eyeball separation has been about 63 mm (between 51 mm and 74.5 mm for women and 53 mm and 77 mm for men). A viewing distance of a personal computer LCD can by about 50 centimeters, slightly less for a portable DVD player, and more for a television. Horizontal viewing angle can be about 35° and vertical about 15°.

Light projection systems can be divided to rear-projection systems and front projection systems (transmission screens). The systems can have a minimum resolution and provide a high contrast image and sufficient gain.

The above information disclosed in this Background section is only for enhancement of understanding of the background of the invention and, therefore, it may contain information that does not form any part of the prior art nor what the prior art may suggest to a person of ordinary skill in the art.

DISCLOSURE OF INVENTION

The object of the present invention is to propose a liquid crystal display (LCD) system for stereovision comprising: a left-eye liquid crystal panel, a right-eye liquid crystal panel, a left-eye circuit controlling said left-eye panel, a right-eye circuit controlling said right-eye panel, where the left-eye liquid crystal panel is to be oriented substantially vertically when viewed and oriented towards a left eye of a viewer and the right-eye liquid crystal panel is to be oriented substantially vertically when viewed and oriented towards a right eye of said viewer.

A further object is to propose the system which can pick up any light tunnel included in the liquid crystal panel and to direct it to any of viewer's eyes.

A further object is to propose the system providing a common liquid crystal panel.

A further object is to propose the system providing a common driver circuit.

A further object is to propose the system where the left-eye panel and/or said right-eye panel comprise one or more pixel route columns.

A further object is to propose the system where the left-eye panel and/or said right-eye panel comprise one or more liquid crystal active lenses which can comprise a curved alignment layer, central and/or peripheral electrodes and/or side wall electrodes, three-dimensional (3D) electrodes, which can be asphere. The liquid crystal active lens can provide one or more vantage zones and/or can have at least partially cylindrical or prismatic shapes.

A further object is to propose the system providing stereovision in at least two perpendicular vision positions, the system providing monovision.

A further object is to propose the system comprising a wiever position sensor.

A further object is to propose the system flexible in at least one direction.

A further object is to propose the system comprising diagonally arranged pixel and/or subpixel routes and/or the system providing substantially diagonally polarized light.

A further object is to propose a photo or video camera system for LCD stereovision comprising a left-eye photo or video electronic-optical recording system, a right-eye photo or video electronic-optical recording system, a focusing system, where said focusing system focus said left-eye photo or video electronic-optical recording system and said right-eye photo or video electronic-optical recording system to obtain a stereoimage to be viewed on the proposed LCD system.

A further object is to propose a method for providing LCD based stereovision comprising the steps of providing liquid crystal active lenses disposed in a raster with voltage to direct light to a desired direction, providing information upon the desired light direction to a chip which can choose the liquid crystal active lens to direct the light. The steps can be repeated.

In a first aspect, the invention discloses a liquid crystal display (LCD) system for stereovision.

In a second aspect, the invention discloses a digital photo/video camera system for an LCD stereovision.

In a third aspect, the invention discloses a method for providing an LCD based stereovision.

BRIEF DESCRIPTION OF DRAWINGS

The invention will now be described by way of example. Only essential elements of the invention are schematically shown and not to scale to facilitate immediate understanding, emphasis being placed upon illustrating the principles of the invention.

FIG. 1 is a schematic cross sectional view of an LCD according to the prior art.

FIG. 2 is a schematic of an LCD system for stereovision according to the present invention.

FIG. 3a is a schematic of a left-eye/right-eye panel.

FIG. 3b is a schematic of a variant of a left-eye/right-eye panel.

FIG. 4 is a schematic of a left-eye/right-eye panel.

FIG. 5 is a schematic simplified cross sectional view of a pixel route column.

FIG. 6 is a schematic of another embodiment of the LCD system for stereovision according to the present invention.

FIG. 7a is a schematic of another embodiment of the LCD system according to the present invention.

FIG. 7b is a schematic of another embodiment of the LCD system according to the present invention.

FIG. 7c is a schematic of a dual position LCD system according to the present invention.

FIG. 8 is a schematic of another embodiment of the LCD system for stereovision according to the present invention.

FIG. 9 is a schematic of another embodiment of the LCD system for stereovision according to the present invention.

FIG. 10 is a schematic of another embodiment of the LCD system according to the present invention.

FIG. 11 is a schematic of another embodiment of the LCD system for stereovision according to the present invention.

FIG. 15b is a schematic of a second step in the variant shown in FIG. 15a.

FIG. 64b is a detailed view of a driving electrode of FIG. 64a.

BEST MODE FOR CARRYING OUT THE INVENTION

Figure 12:
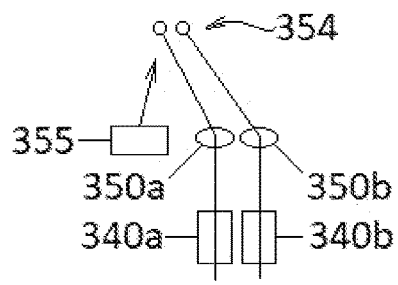
FIG. 12 is a schematic of the LCD system for stereovision according to the present invention.

The following detailed description shows the best contemplated modes of exemplary embodiments. The description is made for the purpose of illustrating the general principles of the invention, and in such a detail that a skilled person in the art can recognise the advantages of the invention, and can be able to make and use the invention. Additional advantages may be learned by practice of the invention. The detailed description is not intended to limit the principle of the presented invention, but only to show the possibilities of it. The description and the detailed description are exemplary and explanatory only.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in a diagram form in order to avoid unnecessarily obscuring various exemplary embodiments.

In the accompanying figures, the size and relative sizes of layers and/or regions may be exaggerated for clarity and descriptive purposes. Also, like reference numerals denote like elements.

Since there are more embodiments of the invention shown in the drawings, no reference numerals has been introduced into the claims for clarity purposes.

The terms used in the claims and the specifications shall refer to their synonyms as well.

A lenticular array is usually used to refer to a linear array of generally cylindrical lenses.

A lenslet array can be: an array of cylindrical lenses, segments of lenses, or any arbitrary organization of lenses. Lenslets may be microlens.

As used in the claims and the specification, "A/B" shall refer to A and/or B.

As used in the claims and the specification, the singular forms are intended to include the plural forms as well and vice versa.

As used in the claims and the specification, the term "liquid crystal active lens" shall preferably not exclusively refer to one or more active lenses configured to provide light refraction in a first direction and/or to rotate at least partially the direction of polarization of the light [e.g. by 90 degree] and/or to provide light refraction in a second direction.

The terms "to comprise", "to include", "to contain", "to provide" and derivatives specify the presence of an element, but do not preclude the presence or addition of one or more other elements or groups and combinations thereof.

The invention will be described in reference to the accompanying drawings.

FIG. 1 is a schematic cross sectional view of an LCD according to the prior art. A typical LCD can be composed of a bottom chassis (100a), a reflector sheet (101), a light guide plate (102), a diffuser sheet (103), a prism sheet (104), a bottom polarizer (105), a glass substrate (106), a thin film transistor (107), an indium tin oxide (pixel electrode) (ITO) (108), an alignment layer (109), a liquid crystal layer (110), an alignment layer (111), an ITO (common electrode) (112), a color filter (RGB) (113), a glass substrate (114), a top polarizer (115), a top chassis (100b). [The typical LCD can further comprise storage capacitors, seals, shorts, bonding pad, black matrix, etc. (not shown).] The liquid crystal layer can comprise liquid crystals and spacers. The glass substrates can be substantially planar.

FIG. 2 is a schematic of a liquid crystal display (LCD) system for stereovision comprising a left-eye panel (120a), a right-eye panel (120b); a left-eye circuit (121a) controlling the left-eye panel (120a), a right-eye circuit (121b) controlling the right-eye panel (120b). The left-eye panel (120a) can be oriented substantially vertically when viewed and oriented towards a left eye (122a) of a viewer and the right-eye panel (120b) can be oriented substantially vertically when viewed and oriented towards a right eye (122b) of the viewer. [The left-eye panel (120a) and the right-eye panel (120b) can be disposed in various ways; they can be interposed, provided in one level, provided behind each other, partially shifted in various directions, provide various rhythms/e.g. left-eye pixel column and right-eye pixel column; double left-eye pixel column and double right-eye pixel column, etc./. The both panels (120a, 120b) (and the whole system) can be switchable to form one panel for monovision.]

FIG. 3a is a schematic of a left-eye/right-eye panel (130a) which can comprise one or more pixel routes (133a).

FIG. 3b is a schematic of a variant of a left-eye/right-eye panel (130b) which can comprise one or more pixel routes (133b).

FIG. 4 is a schematic of a left-eye/right-eye panel (130c) which can be controlled by a left-eye/right-eye circuit (131c).

FIG. 5 is a schematic simplified cross sectional view of a pixel route column (144). A partially shown LCD composition can be composed of a bottom polarizer (145), a substrate layer (146), a thin film transistor (147), an ITO (148), an alignment layer (149), a liquid crystal layer (150), an alignment layer (151), an ITO (152), a color filter (RGB) (153), a substrate layer (154), a top polarizer (155). The LCD can further comprise storage capacitors (161). The liquid crystal layer (150) can comprise liquid crystals (150c) and spacers (150s). [Various other compositions are known in the art.]

FIG. 6 is a schematic of a liquid crystal display (LCD) system for stereovision comprising substantially parallel left-eye and right-eye panels (170), a left-eye and right-eye circuits (not shown). The LCD panels (170) can be oriented substantially vertically in a television (180) when viewed.

FIG. 7a is a schematic of a liquid crystal display (LCD) system for stereovision comprising substantially parallel left-eye and right-eye panels (190), a left-eye and right-eye circuits (not shown). The LCD panels (190) can be oriented substantially vertically in an iPhone (200) [or in an iPad, etc.] when viewed.

FIG. 7b is a schematic of a liquid crystal display (LCD) system for stereovision comprising substantially parallel left-eye and right-eye panels (210), a left-eye and right-eye circuits (not shown). The LCD panels (210) can be oriented substantially vertically in an iPhone (220) [or in an iPad, etc] when viewed.

FIG. 7c is a schematic of a dual position liquid crystal display (LCD) system for stereovision comprising substantially parallel left-eye and right-eye panels (230v, 230h), a left-eye and right-eye circuits (not shown). The LCD panels (230v, 230h) can be oriented substantially vertically in an iPhone (240) [or in an iPad, a portable navigation, etc.] when viewed (a vertical position of the iPhone (240) shown). [The system can have a sense of gravity, e.g. can include an accelerometer.]

FIG. 8 is a schematic of a liquid crystal display (LCD) system for stereovision comprising substantially parallel left-eye and right-eye panels (250), a left-eye and right-eye circuits (not shown). The LCD panels (250) can be oriented substantially vertically in a laptop (270) when viewed.

FIG. 9 is a schematic of a liquid crystal display (LCD) system for stereovision comprising substantially parallel left-eye and right-eye panels (280), a left-eye and right-eye circuits (not shown). The LCD panels (280) can be oriented substantially vertically in a vehicle built-in navigation (290) when viewed.

FIG. 10 is a schematic of a liquid crystal display (LCD) system for stereovision comprising substantially parallel left-eye and right-eye panels (300v, 300h), a left-eye and right-eye circuits (not shown). The LCD panels (300v, 300h) can be oriented substantially vertically in a digital photo/video camera (310) [or in a digital photo camera, etc] when viewed (a horizontal position of the digital photo/video camera (310) shown).

FIG. 11 is a schematic of a liquid crystal display (LCD) system for stereovision comprising substantially parallel left-eye and right-eye panels (320), a left-eye and right-eye circuits (not shown). The LCD panels (320) can be oriented substantially vertically in a medical device (330) [which can be a screening device, a microscope, etc.] when viewed.

FIG. 12 is a schematic of the LCD system for stereovision according to the present invention comprising a right-eye pixel route (340a), a left-eye pixel route (340b) [pixel routes can comprise one or more subpixels], right-eye and left-eye circuits (not shown), a right-eye liquid crystal active lens (350a), a left-eye liquid crystal active lens (350b), [which can form an active lens panel, an active lens layer, etc.], a viewer (354) tracking device (355) [which can be any type of a tracking device comprising any type of sensors and sensing circuits/e.g. optical, magnetic, ultrasonic, etc./and which can sense each eye separately, can measure a distance between viewer's eyes, or can only sense one predetermined eye, a viewer's head position, etc.]. The system can further comprise other sensing circuits [e.g. sensing vertical/horizontal orientation of a display, the viewer's head movement, another incoming or outcoming viewer, etc.].

Figure 13:
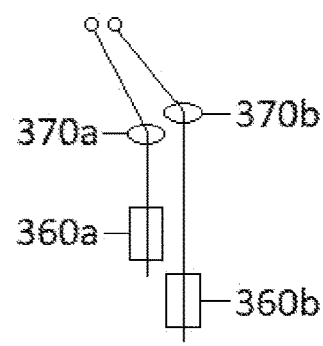
FIG. 13 is a schematic of a variant of the system shown in FIG. 12.

FIG. 13 is a schematic of a variant of the system shown in FIG. 12 showing a possibility of a layered construction of pixel panels (360a and 360b) and active liquid crystal panels (370a and 370 b) [Various other multilayer settings are possible.]

Figure 14:
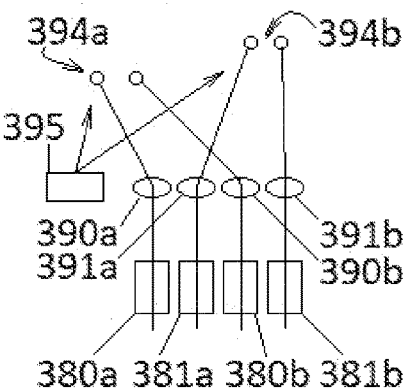
FIG. 14 is a schematic of a variant of the system shown in FIG. 12 for a plurality of viewers.

FIG. 14 is a schematic of a variant of the system shown in FIG. 12 comprising right-eye pixel routes (380a, 381a), left-eye pixel routes (380b, 381b), right-eye and left-eye circuits (not shown), right-eye liquid crystal active lenses (390a, 391a), left-eye liquid crystal active lenses (390b, 391b), a plurality of viewers (394a, 394b) and a tracking device (395).

Figure 15A:
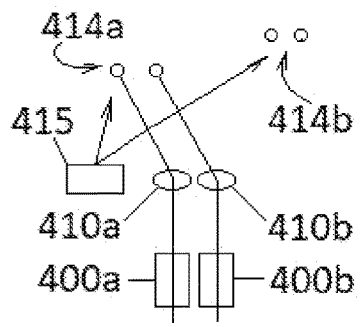
FIG. 15a is a schematic of a first step in a variant of the system shown in FIG. 14.

FIG. 15a is a schematic of a first step in a variant of the system shown in FIG. 14 comprising a right-eye pixel route (400a), a left-eye pixel route (400b), right-eye and left-eye circuits (not shown), a right-eye liquid crystal active lens (410a), a left-eye liquid crystal active lens (410b), a plurality of viewers (414a, 414b) and a tracking device (415) [The system can consecutively saturate the both viewers (414a, 414b)].

Figure 15B:
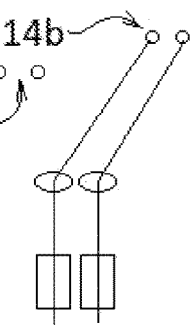

FIG. 15b is a schematic of a second step in the variant shown in FIG. 15a where the system saturates the second viewer (414b).

Figure 16:
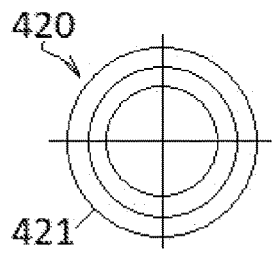
FIG. 16 is a plan view of a liquid crystal active lens according to the present invention.

FIG. 16 is a plan view of a liquid crystal active lens (420) which can comprise liquid crystals (not shown) and a 2D or 3D electrodes layers (421) [e.g. ITO, which can form meshworks with nodes and traces of various 2D or 3D patterns to cover a plane or a 3D space to be able to control the electric field governing liquid crystals' orientation].

Figure 17:
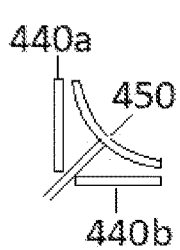
FIG. 17 is a partial plan view of electrode layers according to the present invention.
Figure 18:
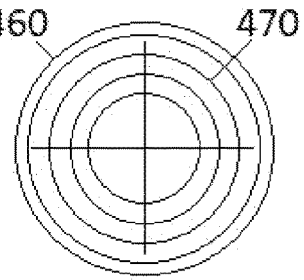
FIG. 18 is a plan view of a two-dimensional (2D) electrode layer pattern according to the present invention.

FIG. 17 is a partial plan view of an electrode layers which can comprise electrodes (440a, 440b) and (450) which can be different in polarity and to which common voltage and lens forming voltage can be applied [such an arrangement can be used to control FIG. 18 is a plan view of a 2D electrode layer pattern which can comprise a bottom layer (460) and a top layer (470).

Figure 19:
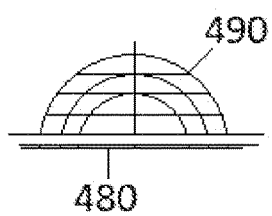
FIG. 19 is a side view of a three-dimensional (3D) electrode layer pattern according to the present invention.

FIG. 19 is a side view of a 3D electrode layer pattern which can comprise a bottom layer (480) [which can be provided in one or more planes] and a top layer (490) [which can be provided by any 3D structure/e.g. half ball, concave structure, asphere, cone, etc/].

Figure 20:
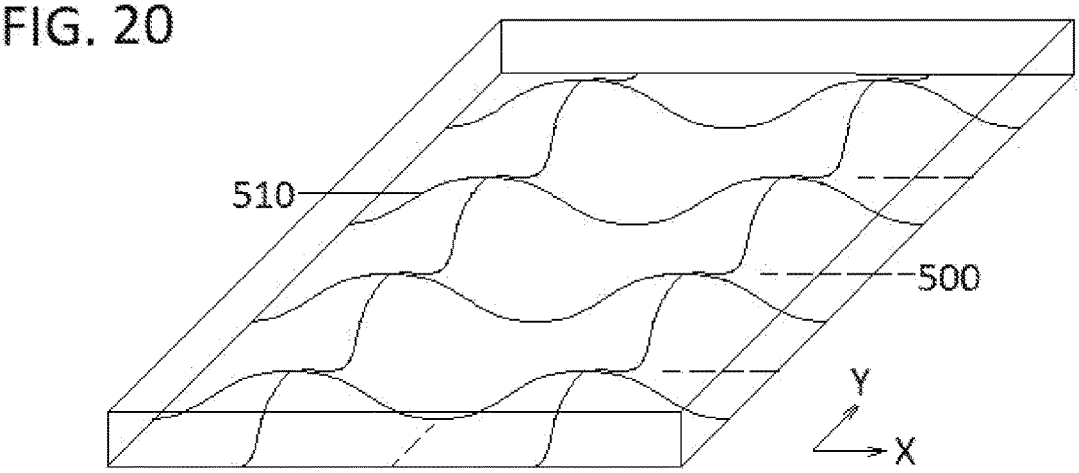
FIG. 20 is an oblique view of a 3D electrode layer pattern according to the present invention.

FIG. 20 is an oblique view of a 3D electrode layer pattern which can comprise a bottom layer (500) and a top layer (510) [which can contain aspheres or different 3D forms, curved surfaces, etc.] which can provide refraction of a polarized light (not shown) in a first direction [e.g. in Y axis and/or X axis directions].

Figure 21:
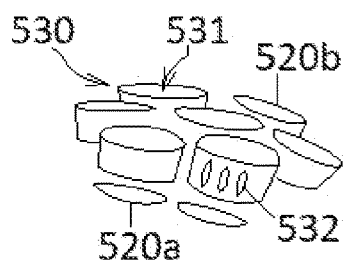
FIG. 21 is a partial perspective illustration of a 3D electrode layer pattern according to the present invention.

FIG. 21 is a partial perspective illustration of a 3D electrode layer pattern which can comprise a bottom layer (520a) [which can contain round, polygon/e.g. hexagon, etc./traces] and a top layer (520b) [which can be formed by round eyes, polyhedron meshwork,/similar to compound bee eyes/, etc.]. The illustration shows cylindric forms of liquid active lenses (530) which can each provide a sort of light tunnels (531) conducting and orienting light in desired directions (i.e. towards a right or left eye of a viewer) and at the same tame blocking the light in another direction (e.g. for the non intended viewer's eye). The tunnels (531) can be formed by oriented liquid crystals (532) and can form a pinhole effect, and a mask layer optically coupled to the lens array.

Figure 22:
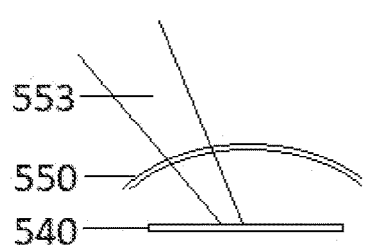
FIG. 22 is a schematic side view of a 3D electrode layer pattern providing a viewing zone.

FIG. 22 is a schematic side view of a 3D electrode layer pattern which can comprise a bottom layer (540) and a top layer (550). The system can provide a viewing zone (553) in which a right eye (or a left eye) of a viewer (not shown) can perceive an image.

Figure 23:
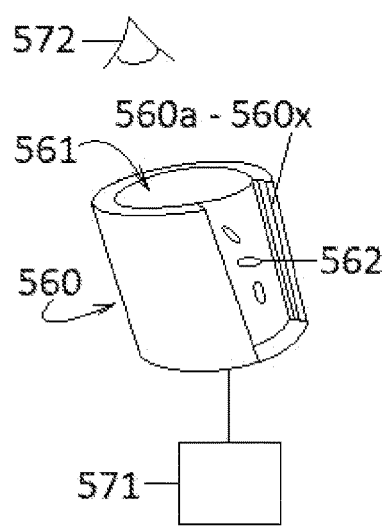
FIG. 23 is a schematic perspective illustration with a partial cutout of a liquid active lens providing a light tunnel and a driver circuit according to the present invention.

FIG. 23 is a schematic perspective illustration with a partial cutout of a liquid active lens (560) providing a light tunnel (561) [which can comprise a liquid crystalline material (562)], a driver circuit (571) [which can control voltages provided in the light tunnel (561) between electrodes (560a to 560x)/there can be two or more electrode layers/to orient the liquid crystals] which can direct light towards a viewer's eye (572) [which can be a right eye or a left eye and which can be in any position in front of a liquid crystal display (not shown) comprising a liquid crystal panel including the light tunnel (561)]. Orienting the light tunnel (561) can be achieved by varying voltages between the electrodes (560a to 560x) [which can be transparent and include a variety of 2D and/or 3D traces and meshworks within the cylindric shape (as shown)/other enveloping shapes are possible/]. Other layers [e.g. an alignment layer] (not shown) can be provided to suitably orient the liquid crystals in a non-activated state.

Figure 24:
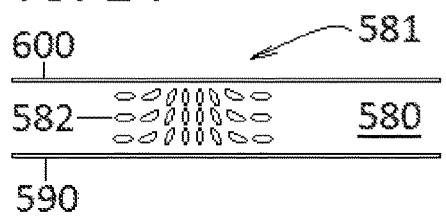
FIG. 24 is a partial cross sectional view of a light tunnel.

FIG. 24 is a partial cross sectional view of a light tunnel (581) [light can be linearly polarized perpendicularly to the page] which can be formed in a liquid crystal layer (580) by applying voltages between a bottom electrode layer (590) and a top electrode layer (600). [Oriented liquid crystals (582) can form a pinhole effect.]

Figure 25:
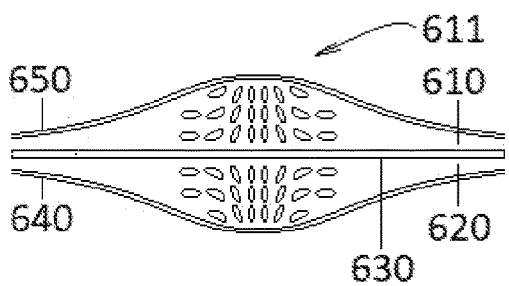
FIG. 25 is a partial cross sectional view of a light tunnel with a central electrode and peripheral electrodes.

FIG. 25 is a partial cross sectional view of a light tunnel (611) which can be formed in liquid crystal layers (610, 620) by applying voltages between a central electrode layer (630) and peripheral electrodes layers which can be a bottom electrode layer (640) and a top electrode layer (650). [Oriented liquid crystals (582) can lead the light in a desired direction/shown the direction perpendicular to the central electrode layer (630) but any direction under any angle is contemplated/.]

Figure 26:
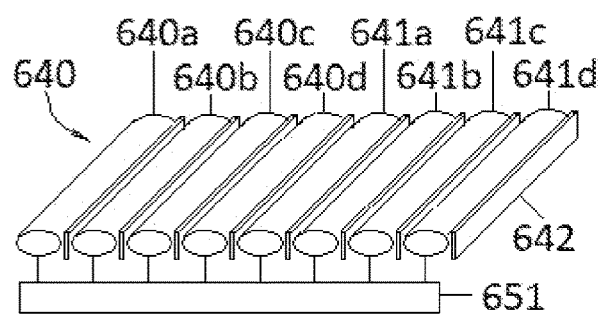
FIG. 26 is an oblique view of liquid crystal active lenses according to the present invention.

FIG. 26 is an oblique view of liquid crystal active lenses panel (640) which can comprise liquid crystal active lenses (640a, 640b, 640c, 640d, 641a, 641b, 641c, 641d) [which can correspond each to a different subpixel and color element/e.g. 2G:1R:1B/and which can have various forms and shapes including Fresnel lenses], spacers (642) [which can have various forms and shapes/e.g. cylindrical, polygonal, planar, etc./] and which can be controlled by a driver circuit (651) and which can be oriented substantially vertically [e.g. in a television (not shown)] when viewed.

Figure 27:
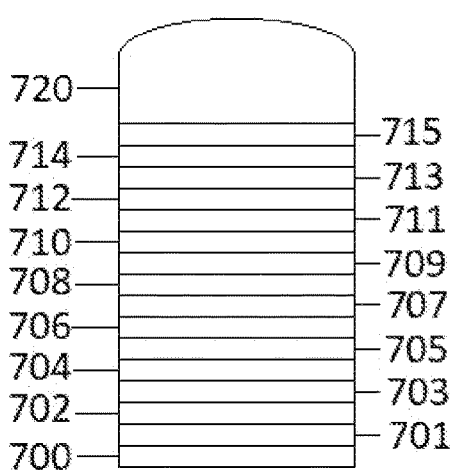
FIG. 27 is a schematic cross sectional view of an LCD according to the present invention.

FIG. 27 is a schematic cross sectional view of an LCD according to the present invention. An LCD can be composed of a bottom chassis (700), a reflector sheet (701), a light guide plate (702), a diffuser sheet (703), a prism sheet (704), a bottom polarizer (705), a glass substrate (706), a thin film transistor (707), an indium tin oxide (pixel electrode) (ITO) (708), an alignment layer (709), a liquid crystal layer (710), an alignment layer (711), an ITO (common electrode) (712), a color filter (RGB) (713), a glass substrate (714), a top polarizer (715), a liquid crystal active lens (720) and a top chassis (not shown) [which can be planar or can copy the curvature of the active lens' top surface].

Figure 28:
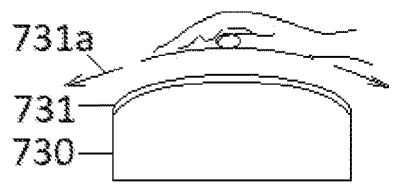
FIG. 28 is a partial cross sectional view of providing a curved alignment layer on a top surface of a liquid crystal active lens according to the present invention.

FIG. 28 is a partial cross sectional view of providing a curved alignment layer (731) on a top surface of a liquid crystal active lens (730) according to the present invention. The alignment layer can be provided by any technique known in the art [e.g. rubbing, etc.] preferably in the direction (731*a*) substantially parallel or under an angle to the curved top surface [similarly on a planar (as shown) or curved bottom surface] of the liquid crystal lens, in that way liquid crystals (not shown) in a non-activated state can be substantially parallel or under a (predetermined) angle to the alignment layer and in an activated state can change direction substantially perpendicular to the alignment layer in a location determined by the voltage provided between a bottom electrode and a top electrode (not shown). It could be a long way for the liquid crystals to get oriented when voltage applied but there is no need for a rapid response as in standard LCD displays because the viewer's position movement can be relatively slow compared to the response rapidity of the liquid crystals in the liquid crystal active lenses.

Figure 29:
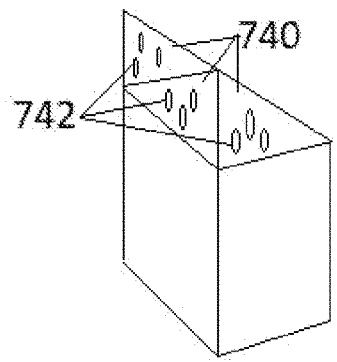
FIG. 29 is a perspective view of liquid crystal active lenses according to the present invention.

FIG. 29 is a perspective view of liquid crystal active lenses (740) according to the present invention [which can have a shape of a triangular prism (as shown), of a quadrilateral prism, etc.] which can form a layer. Electrode layers (not shown) can be provided on the side walls of the prism. Alignment layers (not shown) can be provided on the side walls to direct liquid crystals (742) in a non-activated state parallel to the side walls and on the top and bottom surfaces to direct the liquid crystals in a non-activated state perpendicularly to the top and bottom surfaces. Electrodes provided on the side walls can activate liquid crystals (742) and orient them into a desired direction. The three side walls electrodes can provide voltages among them to direct the liquid crystals (742) in a desired azimuth and elevation (similarly as shown in FIG. 23) [similarly for multilateral prisms, etc.].

Figure 30:
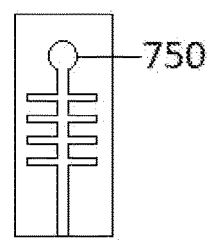
FIG. 30 is a detailed side view of an electrode in a liquid crystal active lens according to the present invention.

FIG. 30 is a detailed side view of an electrode (750) which can be used in a liquid crystal active lens according to the present invention (e.g. as shown in FIG. 29) [different shapes can convene to different embodiments of the invention, layered designs, various traces or meshworks are contemplated, as well].

Figure 31:
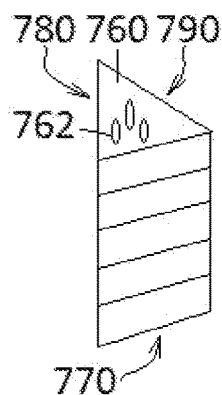
FIG. 31 is a variant of the liquid crystal active lens shown in FIG. 29.

FIG. 31 is a variant of the liquid crystal active lens (760) with layered side wall electrodes (770, 780, 790) [which can be provided with insulation layers (not shown)]. Voltages provided among various layers of the electrodes (770, 780, 790) can orient liquid crystals (762) in desired directions.

Figure 32:
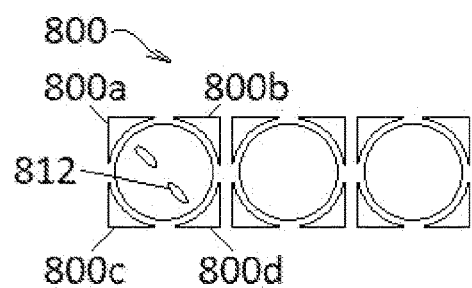
FIG. 32 is a plan view of an electrode layer according to the present invention.
Figure 34:
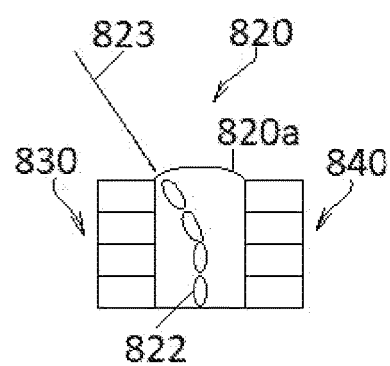
FIG. 34 is a cross sectional view of a liquid crystal active lens according to the present invention.

FIG. 32 is a partial detailed plan view of an electrode layer (800) for liquid crystal active lens (810) of a cylindric shape according to the present invention. Voltages provided among various side wall electrodes (800*a*, 800*b*, 800*c*, 800*d*) can orient liquid crystals (812) in desired directions. [Voltages can be provided among the same layer and among various layers (as shown in FIG. 34). Various numbers, shapes, combinations and patterns of surrounding electrodes can be provided. The electrode layer (800) can further comprise other components like thin film transistors, storage capacitors, etc. (not shown) as known in the art.]

Figure 33:
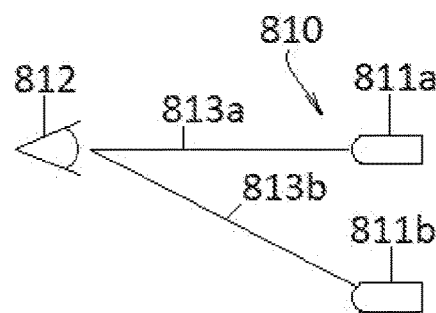
FIG. 33 is a schematic of an LCD system for stereovision according to the present invention.

FIG. 33 is a schematic side view of an LCD system for stereovision according to the present invention. Light tunnels (811*a*, 811*b*) can direct light (813*a*, 813*b*) towards a viewer's eye (812) and can be provided in an (vertical) eye panel (810). [Even in case when the viewer incline his head when watching the LCD stereovision system, it will still be vertical eye panels to provide stereovision because/e.g. when shooting a film scene with a stereovision camera according to the present invention/the stereovision camera on a film set will be (mostly) held in a (substantially) vertical position. In the mentioned case of the inclined viewer's head, to achieve a quality stereo image it would be convenient for a viewer position sensor to track each viewer's eye separately so as to be able to measure a horizontal distance of viewer's eyes and to adjust the left-eye and right-eye (vertical) panels, i.e. to orient light tunels by controlling liquid crystal active lenses and to control respective pixel routes.]

FIG. 34 is a cross sectional view of a liquid crystal active lens (820) with layered side wall electrodes (830, 840). Voltages provided among various layers of the electrodes (830, 840) [which can form various networks, patterns, etc.] and layers parallel to the page (not shown) can orient liquid crystals (822) to direct light (823) in a desired direction [the upper surface (820*a*) of the active lens (820) can be provided with a suitable alignment layer and suitably formed so that the light (823) passes at right angle through the surface to avoid color distortion and to eliminate unwanted image artifacts.

Figure 35:
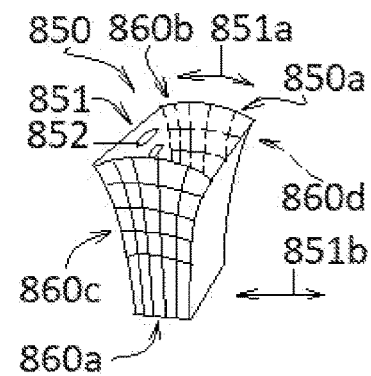
FIG. 35 is a perspective view of a liquid crystal active lens according to the present invention.

FIG. 35 is a perspective view of a liquid crystal active lens (850) with an upper surface (850*a*) [which can be provided with a curved top alignment layer oriented in the shown direction (851*a*)] suitable for a single position stereovision system [e.g. a television]. The active lens (850) can comprise a bottom electrode (860*a*), a bottom alignment layer oriented in the shown direction (851*b*), a three-dimensional top electrode (860*b*) and side wall electrodes (860*c*, 860*d*). Voltages applied between the side wall electrodes (860*c*, 860*d*). can orient liquid crystals (852) similarly as shown in FIG. 34. The liquid crystals (852) can be oriented in the direction (851*a*) when no voltage applied. The oriented liquid crystals (852) can form a light tunnel (851). Voltages applied between the bottom electrode (860*a*) and the top electrode (860*b*) can further focus the light tunnel (851). The liquid crystal active lens (850) can be preferably provided with either pair of the electrodes (860*a*, 860*b*, 860*c*, 860*d*) with voltages applied to control the light tunnel (851). Polarized light will experience a higher index of refraction if its electric field is parallel to the longitudinal axis of the aligned liquid crystal molecules and on the contrary if the electric field of the light is perpendicular to the longitudinal axis of the aligned liquid crystals the polarized light will experience a lower index of refraction.

Figure 36:
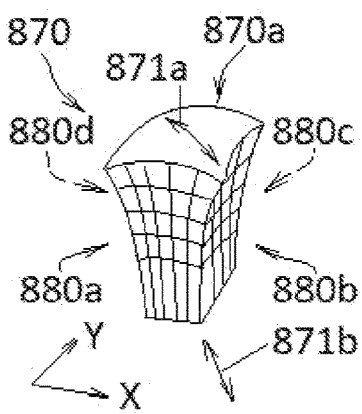
FIG. 36 is a perspective view of another liquid crystal active lens according to the present invention.

FIG. 36 is a perspective view of a liquid crystal active lens (870) with an upper surface (870*a*) [which can be provided with a curved top alignment layer oriented in the shown direction (871*a*)] suitable for a dual position stereovision system [e.g. a smartphone]. The active lens (870) can comprise side wall electrodes (880*a*, 880*b*, 880*c*, 880*d*) [which can be formed by conductive patches, lines, etc. in various patterns, mesworks, networks, etc.] and a bottom alignment layer oriented in the shown direction (871b). Light can be diagonally polarized in the direction (871b). When no voltage applied liquid crystals (not shown) can be twisted between the directions (871a and 871b). When voltages applied between opposite side wall electrodes (880a and 880c or 880b and 880d) respective light tunnels (not shown) can bend light into a desired direction [e.g. in Y axis and/or X axis directions] corresponding to a smartphone orientation and a viewer's eyes (not shown) position. Similarly voltages can be applied between top and bottom electrodes (not shown) to orient liquid crystals.

Figure 37:
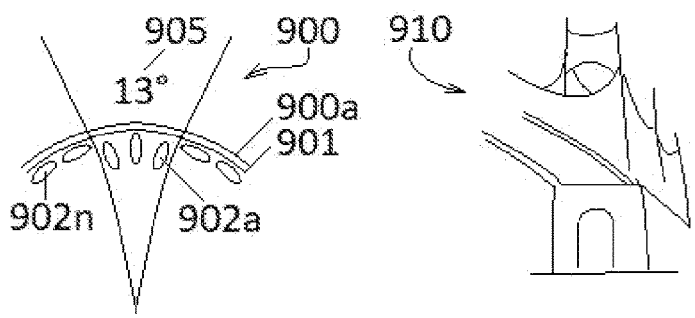
FIG. 37 is a schematic partial sectional view of a liquid crystal active lens providing a defined viewing angle.

FIG. 37 is a schematic partial sectional view of a liquid crystal active lens (900) providing a defined viewing angle (905) [which can be e.g. 13°, etc.] by activating liquid crystals (902a) [e.g. to a position perpendicular to the page for a perpendicularly to the page polarized light] in a defined vantage zone. Non-activated liquid crystals (902n) can rest oriented parallel to an upper surface of the lens (900a) due to a parallel oriented alignment layer (901). The activated liquid crystals (902a) can be activated by electrodes according to the present invention [e.g. by a bottom electrode, side wall electrodes, 3D top electrode]. The activated liquid crystals (902a) and the non-activated liquid crystals (902n) can form a sort of pupil on the upper surface of the lens (900a).

Figure 38:
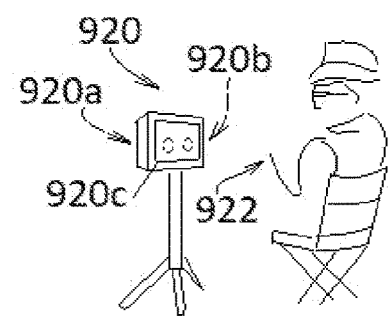
FIG. 38 is a schematic of a filming set using a stereo camera according to the present invention.

FIG. 38 is a schematic of a filming set (910) using a stereo camera (920) which can include a left-eye photo/video electronic-optical recording system (920a); a right-eye photo/video electronic-optical recording system (920b) [which can be able to adjust horizontal separation of the systems/e.g. lenses/, etc.]; a focusing system (not shown) [which can be any type of the focusing system known in the art]. The camera (920) is supposed to be held in substantially vertical position to provide respective left-eye and right-eye panels images to be viewed on an LCD system for stereovision according to the present invention which itself provides the left-eye and right eye panels to be viewed by a viewer. Since an approximate eyeball separation differs for each individual (922) [e.g. men, women, children, pets] and for various viewing head positions [e.g. inclined head, partially rotated head, etc.] it would be optimal that the camera (910) dispose of more left-eye/right-eye photo/video electronic-optical recording systems, the more the better. It would record stereo images for a plurality of viewer's demands which could pose technical problems. Thus, in reality a limited number of stereo images will be shot [e.g. a "standard", a "wide" a "narrow" so that women, men, children can choose their preference or so that the system can automatically chose in the above mentioned case of the "inclined viewer's head". Thus, it is contemplated as a feature of the present invention, that the stereo camera (920) would provide one or more pairs of left-eye/right eye electronic-optical recording systems to satisfy a demand of a plurality of group of viewers in according to their respective eyeball separation and/or head position. The stereo camera (920) can comprise a liquid crystal display for stereovision (920c) according to the present invention.

Figure 39:
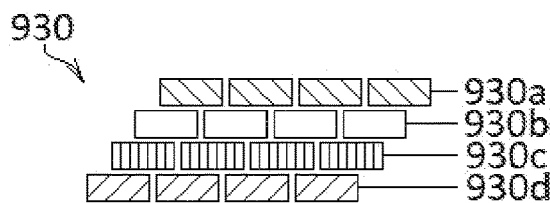
FIG. 39 is a schematic of a liquid crystal active lenses and a color filter layout for an LCD system and a stereo camera according to the present invention.

FIG. 39 is a schematic of a layout of a diagonally oriented color filter (930) which can include color elements (930a, 930b, 930c, 930d) [e.g. 2G:1R:1B]. The layout can be used in the LCD system and an image sensor of the stereo camera according to the present invention. [Each color element can correspond with a liquid crystal active lens and a pixel route column in the LCD system and with a pixel electrode and signal charge readout circuits in the stereo camera.]

Figure 40:
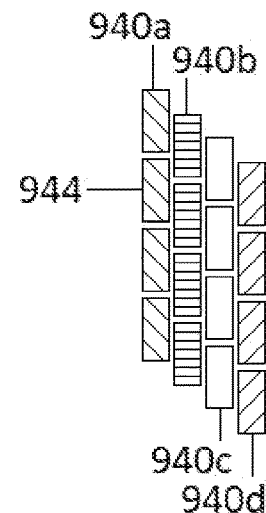
FIG. 40 is a variant of the embodiment shown in FIG. 39.
Figure 41:
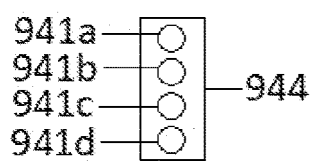
FIG. 41 is a detailed view of a case shown in FIG. 40.
Figure 42:
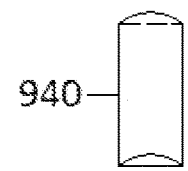
FIG. 42 is an oblique view of a liquid crystal active lens which can be suitable for the case shown in FIG. 41.

FIG. 40 is a schematic of a liquid crystal display (LCD) system for stereovision comprising a left-eye/right-eye panels (940a, 940b, 940c, 940d), a left-eye/right-eye circuit (not shown) controlling the panels (940a, 940b, 940c, 940d) which can be oriented substantially vertically when viewed and oriented towards a left eye or a right eye of a viewer (or viewers). Each panel (940a, 940b, 940c, 940d) can comprise a case (944) which can correspond to one pixel route column which can include color elements (as shown in FIG. 41) and which can further correspond to a liquid crystal active lens (e.g. as shown in FIG. 42). [The cases (944) can be arranged in a diagonal (as shown) or not. The diagonal can be convenient for the dual position LCD systems according to the invention.

FIG. 41 is a detailed view of the case (944) shown in FIG. 40 which can correspond to four subpixels (941a, 941b, 941c, 941d) which can each correspond to a different color element [e.g. 2G:1R:1B].

FIG. 42 is an oblique view of a liquid crystal active lens (940) which can be suitable for the case (944) shown in FIG. 41 [such an embodiment can be used in a stereo television].

Figure 43:
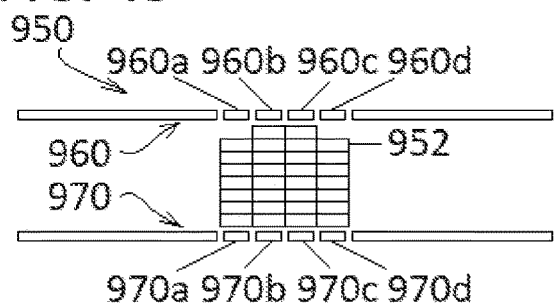
FIG. 43 is a schematic cross sectional view of electrode layers of a liquid crystal active lens according to the present invention.

FIG. 43 is a schematic cross sectional view of electrode layers (960, 970) which can include electrodes (960a, 960b, 960c, 960d and 970a, 970b, 970c, 970d) of a liquid crystal active lens (950). Voltages applied between the electrodes (960a, 960b, 960c, 960d and 970a, 970b, 970c, 970d) can orient liquid crystals (952) [which can have a positive/or negative/dielectric constant anisotropy]. FIG. 43 shows a converging lens wherein voltage applied between central electrodes (960b and 970b; 960c and 970c) can be higher than voltage applied between lateral electrodes (960a and 970a; 960d and 970d) [crosstalk can be contemplated; voltages between adjacent liquid crystal active lenses can be provided with different polarities to improve crosstalk].

Figure 44:
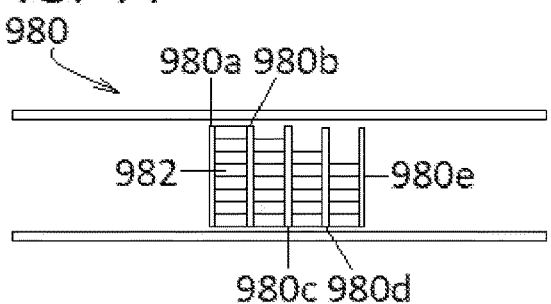
FIG. 44 is a schematic cross sectional view of electrode layers of another embodiment of a liquid crystal active lens according to the present invention.

FIG. 44 is a schematic cross sectional view of electrode layers (980a, 980b, 980c, 980d, 980e) of a liquid crystal active lens (980). Voltages applied between the electrode layers (980a, 980b, 980c, 980d, 980e) can orient liquid crystals (982) [which can have a positive/or negative/dielectric constant anisotropy] to form e.g. a refracting prism or a quarter lens, etc. [crosstalk can be contemplated; voltages between adjacent liquid crystal active lenses can be provided with different polarities to improve crosstalk]. Embodiments shown in FIGS. 43 and 44 can be combined.

Figure 45:
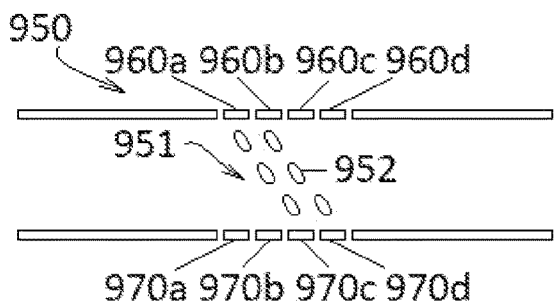
FIG. 45 is the liquid crystal active lens shown in FIG. 43 providing a light tunnel.

FIG. 45 is the liquid crystal active lens (950) shown in FIG. 43 wherein voltages can be primarily applied between electrodes (960a, 970c and 960b and 970d) to orient liquid crystals (952) to form a light tunnel (951) into a desired direction [e.g. askew under a desired angle].

Figure 46:
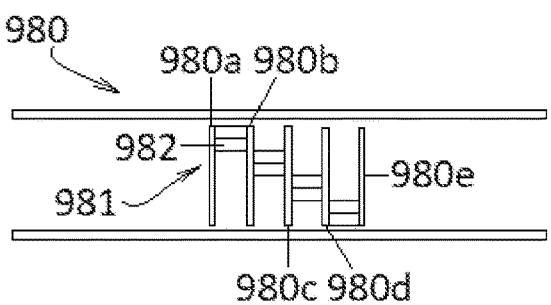
FIG. 46 is the liquid crystal active lens shown in FIG. 44 providing a light tunnel.

FIG. 46 is the liquid crystal active lens (980) shown in FIG. 44 wherein voltages can be applied among various parts of the electrode layers (980a, 980b, 980c, 980d, 980e) [e.g. gradually from top to bottom, etc.] to orient liquid crystals (982) to form a light tunnel (981) into a desired direction [e.g. askew under a desired angle].

Figure 47:
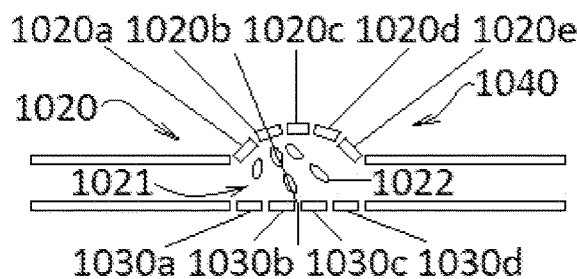
FIG. 47 is a schematic cross sectional view of electrode layers of a liquid crystal active lens according to the present invention.

FIG. 47 is a schematic cross sectional view of electrodes (1020a, 1020b, 1020c, 1020d, 1020e and 1030a, 1030b, 1030c, 1030d) wherein the top layer (1020) can be 3D modelled (i.e. can form a three-dimensional electrode) at a liquid crystal active lens (1040). Voltage can be applied between any of the electrodes (1020a, 1020b, 1020c, 1020d, 1020e and 1030a, 1030b, 1030c, 1030d). FIG. 47 shows a light tunnel (1021) created by voltage applied primarily between electrodes (1020b and 1030b with 1030c). Liquid crystals (1022) with positive dielectric constant anisotropy can become oriented as shown in FIG. 47. A curved alignment layer (not shown) can be provided on the top electrodes (1020a, 1020b, 1020c, 1020d, 1020e) [e.g. parallel to the curved top surface].

Figure 48:
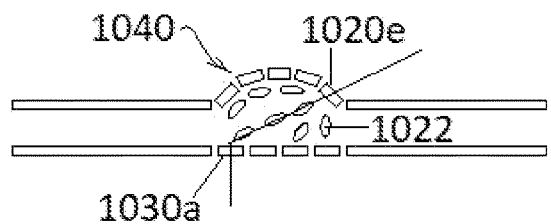
FIG. 48 is the liquid crystal active lens shown in FIG. 43 in a different liquid crystals setting.

FIG. 48 is the liquid crystal active lens (1040) shown in FIG. 43 in a different liquid crystals (1022) setting wherein voltage is primarily applied between electrodes (1020e and 1030a).

Figure 49:
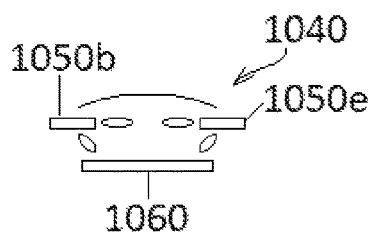
FIG. 49 is a schematic cross sectional view showing the possibilities to change focus length of the liquid crystal active lens according to the present invention.
Figure 50:
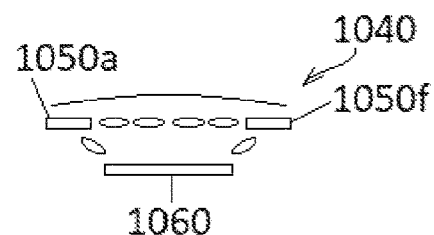
FIG. 50 is the liquid crystal active lens shown in FIG. 49 with a different focus length.
Figure 51:
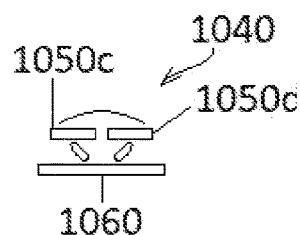
FIG. 51 is the liquid crystal active lens shown in FIG. 49 with still a different focus length.

FIG. 49 is a schematic cross sectional view showing the possibilities to change vantage zone width and focus length [e.g. the lower the voltage the shorter the focus length] of the liquid crystal active lens (1040) by applying voltage between electrodes (1050b, 1050e and 1060). [Only electrodes with applied voltage are shown in FIGS. 49 to 51.]

FIG. 50 is the liquid crystal active lens shown in FIG. 49 with a long focus length by applying voltage between electrodes (1050a, 1050f and 1060).

FIG. 51 is the liquid crystal active lens shown in FIG. 49 with a short focus length by applying voltage between electrodes (1050c, 1050d and 1060).

Figure 52:
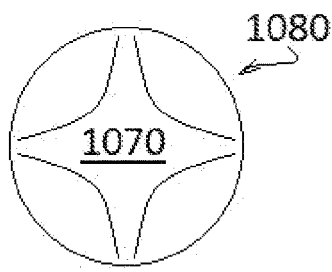
FIG. 52 is a schematic plan view of pupil shapes of a liquid crystal active lens according to the present invention.

FIG. 52 is a schematic plan view of pupil shapes (1070) [e.g. in a form of a four-pointed star which can be composed of two substantially perpendicularly oriented slits and/or which can respond to various pixel patterns] of a liquid crystal active lens (1080) which can convene to form a left-eye/right-eye liquid crystal panel and which can enable to provide stereovision in two substantially perpendicular vision positions.

Figure 53:
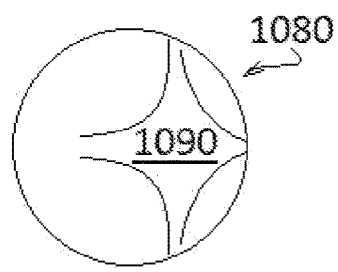
FIG. 53 is the liquid crystal active lens shown in FIG. 52 with a different pupil shape.

FIG. 53 is the liquid crystal active lens (1080) shown in FIG. 52 with a pupil shape (1090) similar as shown in FIG. 52 oriented to one side.

Figure 54:
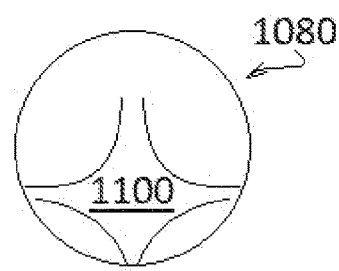
FIG. 54 is the liquid crystal active lens shown in FIG. 52 with still a different pupil shape.

FIG. 54 is the liquid crystal active lens (1080) shown in FIG. 52 with still a different pupil shape (1100) oriented to the bottom of the page [which can correspond to FIG. 53 when viewed in a perpendicular vision position].

Figure 55:
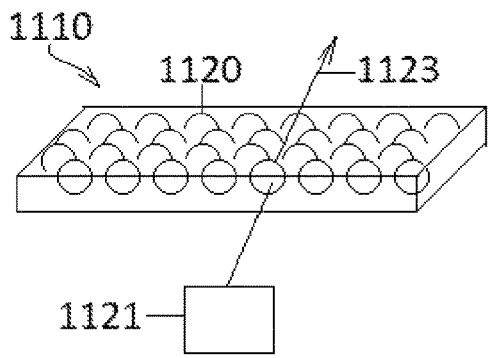
FIG. 55 is a schematic oblique view of a liquid crystal active lenses layer and of a method for providing an LCD based stereovision.

FIG. 55 is a schematic oblique view of a liquid crystal active lenses layer (1110) and of a method for providing an LCD based stereovision wherein liquid crystal active lenses (1120) disposed in a raster [e.g. as shown or any kind of the raster can be provided, e.g. based on a matrix characterised by rows and columns] can be provided with voltage [e.g. a driving voltage in a form of driving signals can be provided to driving electrodes by a driver circuit/e.g. a controller (1121)/] to direct light (1123) to a desired direction.

Figure 56:
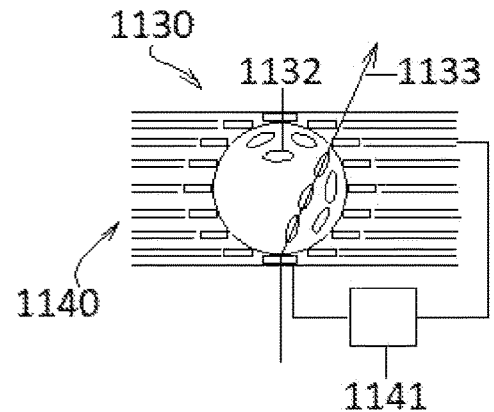
FIG. 56 is a schematic cross sectional view of a liquid crystal active lens and of a method for providing an LCD based stereovision.

FIG. 56 is a schematic cross sectional view of a liquid crystal active lens (1130) which can comprise central and peripheral electrodes (1140) [which can be provided in layers insulated by insulating layers and which can comprise a plurality of patterned conductive lines formed by a deposition of a transparent material as known in the art; the layers can be disposed between transparent substrates (not shown)/ e.g. from glass or polymer/]. Information [e.g. based upon a signal from viewer's eye tracking sensing circuit] can be provided to a controller (1141) upon a desired direction wherein the controller (1141) can choose the liquid crystal active lens (1130) to direct light (1133) in the desired direction [e.g. towards a chosen viewer's eye] by applying voltage between chosen electrodes (1140) to orient liquid crystals (1132). [More such crystal active lenses (1130) form part of respective left-eye and right eye panels (not shown).]

Figure 57:
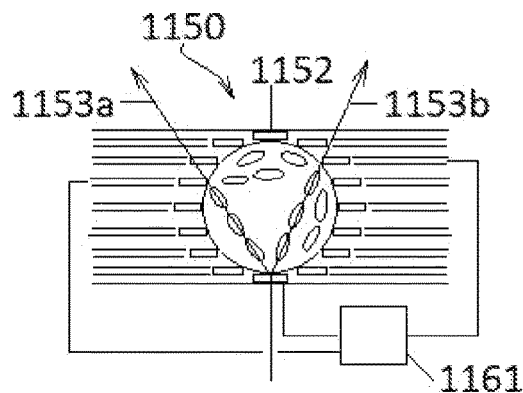
FIG. 57 is a schematic cross sectional view of another embodiment of a liquid crystal active lens and of a method for providing an LCD based stereovision.

FIG. 57 is a schematic cross sectional view of another embodiment of a liquid crystal active lens (1150) which can be constructed similarly as shown in FIG. 56. Information can be provided to a controller (1161) upon desired directions wherein the controller (1161) can choose the liquid crystal active lens (1150) to direct light (1153a, 1153b) in the desired direction [e.g. towards chosen viewers' eyes] by applying voltage between chosen electrodes (1160) to orient liquid crystals (1152).

Figure 58:
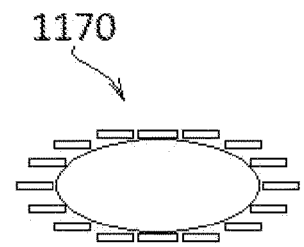
FIG. 58 is a schematic cross sectional view of another embodiment of a liquid crystal active lens according to the present invention.

FIG. 58 is a schematic cross sectional view of another embodiment of a liquid crystal active lens (1170) constructed similarly as shown in FIGS. 56 and 57 with a different (e.g. lenticular) form.

Figure 59:
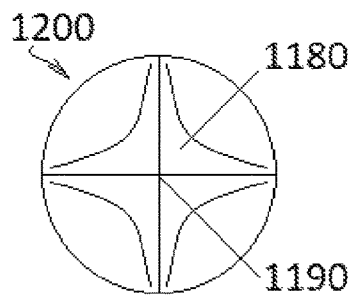
FIG. 59 is a schematic plan view of pupil shapes in relation with electrode shapes of a liquid crystal active lens according to the present invention.

FIG. 59 is a schematic plan view of a pupil shape (1180) [e.g. in a form of two crossed slits] in relation with electrode shapes (1190) [e.g. in a form of crossed lines, only active electrodes shown] of a liquid crystal active lens (1200).

Figure 60:
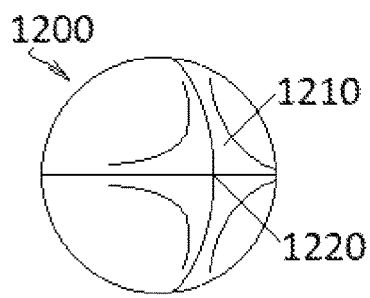
FIG. 60 is the liquid crystal active lens shown in FIG. 59 with a different pupil shape.

FIG. 60 is the liquid crystal active lens shown in FIG. 59 with a different pupil shape (1210) [which can be suitable to direct the light sidewards to the plane of a display] in relation with different active electrodes (1220).

Figure 61:
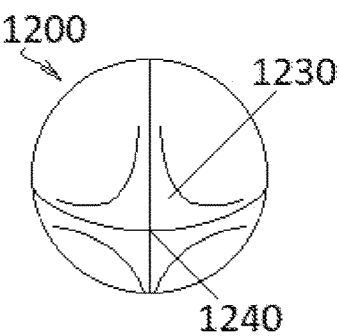
FIG. 61 is the liquid crystal active lens shown in FIG. 59 with still a different pupil shape.

FIG. 61 is the liquid crystal active lens shown in FIG. 59 with still a different pupil shape (1230) [which can direct the light downwards or sidewards when the display rotated ninety degrees] in relation with different active electrodes (1240).

Figure 62:
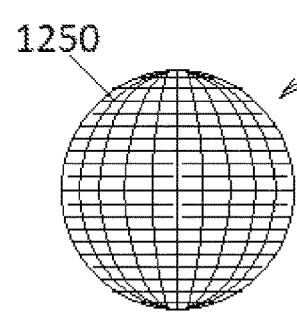
FIG. 62 is a schematic side view of electrode shapes of a liquid crystal active lens according to the present invention.

FIG. 62 is a schematic side view of another electrodes matrix (1250) [e.g. in a form of parallels and meridians] of a liquid crystal active lens (1260).

Figure 63:
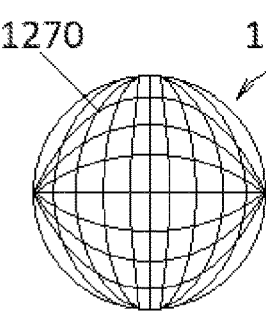
FIG. 63 is a schematic plan view of electrode shapes of a liquid crystal active lens according to the present invention.

FIG. 63 is a schematic plan view of still another electrodes matrix (1270) of a liquid crystal active lens (1280).

Figure 64A:
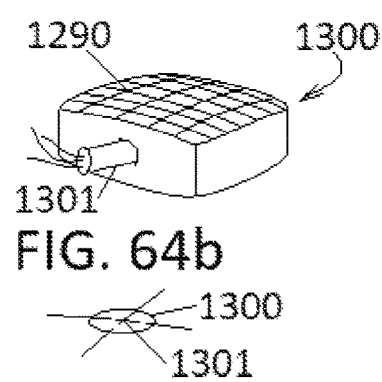
FIG. 64a is a perspective illustration of electrode shapes of a liquid crystal active lens according to the present invention.

FIG. 64a is a perspective illustration of another electrodes matrix (1290) of a liquid crystal active lens (1300) which can be connected to a driving circuit by a plurality of conductive lines (1301).

Figure 64B:
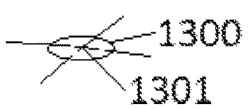

FIG. 64b is a detailed view of a driving electrode (1300) [which can have round or any other shape] which can be situated at an intersection of a plurality of conductive lines (1301). [Plurality of thin film transistors (TFTs) (not shown) may be disposed in correspondence with driving electrodes (1300). Components of TFTs, e.g. gates and sources, may be respectively connected to the conductive lines (1301) which can be gate lines and data lines associated with corresponding rows and columns of the matrix formation, drains may be connected to pixel electrodes.]

Figure 65:
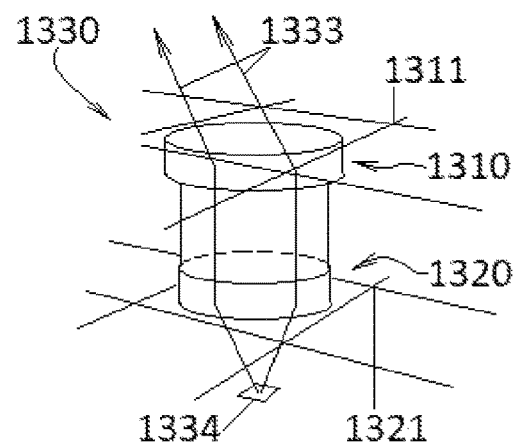
FIG. 65 is a perspective illustration of multiple electrode layers of a liquid crystal active lens according to the present invention.

FIG. 65 is a perspective illustration of multiple electrode layers (1310, 1320) [which can be connected to a plurality of conductive lines (1311, 1321)] of a liquid crystal active lens (1330). Multiple electrode layers can help concentrate and direct the light (1333) [e.g. coming from a (sub-) pixel (1334), etc.]

Figure 66:
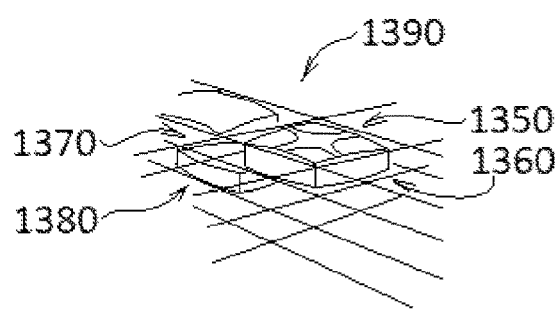
FIG. 66 is a perspective illustration of multiple electrode layers of another embodiment of a liquid crystal active lens according to the present invention.

FIG. 66 is a perspective illustration of multiple electrode layers (1340, 1350, 1360, 1370) of another embodiment of multiple layers liquid crystal active lenses (1390).

Figure 67:
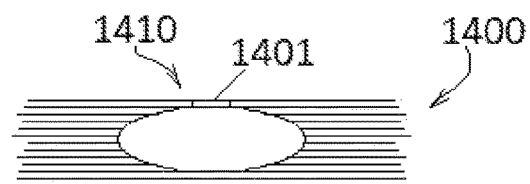
FIG. 67 is a side view of multiple electrode layers of another embodiment of a liquid crystal active lens according to the present invention and an illustration of a fabrication process.

FIG. 67 is a side view of multiple electrode layers (1400) [which can comprise central and peripheral electrodes] of another embodiment of a liquid crystal active lens (1410) according to the present invention and an illustration of a fabrication process [e.g. the layers (1400) can be provided on a suitable transparent polymer substrates, and electrodes from a transparent material can be deposed on insulating layers which can form a cavity to be filled/e.g. by an orifice (1401)/with a liquid crystalline material].

Figure 68:
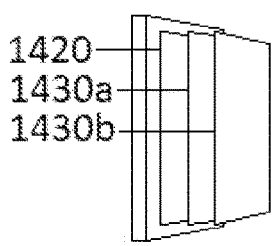
FIG. 68 is a perspective illustration of a device with a display and left-eye and right-eye layers of active liquid crystal lenses according to the present invention.

FIG. 68 is a perspective illustration of a device with a display (1420) [which can include crossed polarizers which can be diagonally oriented] and left-eye and right-eye panels (1430a, 1430b) of active liquid crystal lenses according to the present invention.

Figure 69:
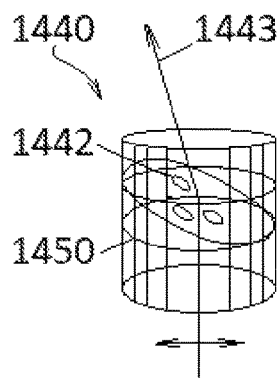
FIG. 69 is a perspective illustration of a liquid crystal active lens in according to the present invention.

FIG. 69 is a perspective illustration of a liquid crystal active lens (1440) which can comprise central and peripheral electrodes (1450) [which can be provided on a cylindrical surface in various patterns and shapes and which can be connected to a plurality of conductive lines]. Information can be provided to a controller (not shown) upon a desired direction wherein the controller can choose the liquid crystal active lens (1440) to direct light (1443) [which can be linearly polarized parallel to the page] in the desired direction [e.g. towards a chosen viewer's eye] by applying voltage between chosen electrodes (1450) to orient liquid crystals (1442).

Figure 70:
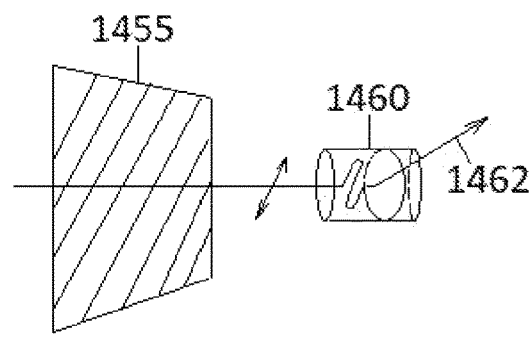
FIG. 70 is a perspective illustration of a set composed of a polarizer and a liquid crystal active lens according to the present invention.

FIG. 70 is a perspective illustration of a set composed of a polarizer (1455) and a liquid crystal active lens (1460) [which can be constructed similarly as shown in FIG. 69] to orient light (1462) in a desired direction.

Figure 71:
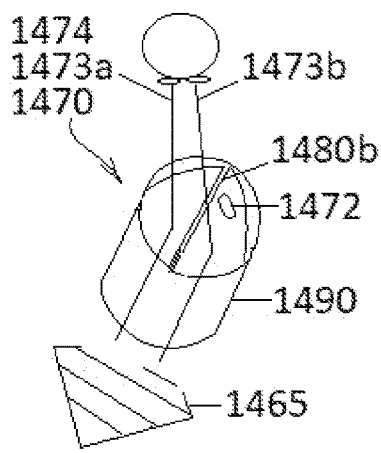
FIG. 71 is a perspective illustration of a set composed of a polarizer and a liquid crystal active lens according to the present invention which composition can be used for devices with a dual position liquid crystal display.

FIG. 71 is a perspective illustration of a set composed of a polarizer (1465) and a liquid crystal active lens (1470) which can comprise central electrodes (1480) [e.g. a mutually electrically insulated pair of electrodes in a patterned network with conducting lines] and peripheral electrodes (1490) [which can be provided on a cylindrical surface in a patterned network with conducting lines]. Information can be provided to a controller (not shown) upon a desired direction wherein the controller can choose the liquid crystal active lens (1470) to direct light (1473*a*, 1473*b*) [e.g. towards eyes of a viewer (1474)] in the desired direction by applying voltage between chosen electrodes (1480, 1490) to orient liquid crystals (1472). Different voltages may be applied between the electrodes (1480*a*, 1490*a* and 1480*b*, 1490*b*). The shown set can be used for devices with a dual position liquid crystal display.

Figure 72:
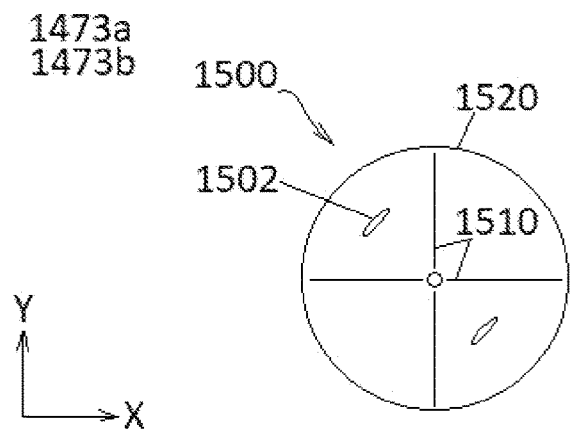
FIG. 72 is a schematic of another embodiment of a liquid crystal active lens according to the present invention for diagonally polarized light which can be used for devices with a dual position liquid crystal display.

FIG. 72 is a schematic plan view of another embodiment of a liquid crystal active lens (1500) for diagonally polarized light which can comprise central electrodes (1510) [which can have a planar crossed form (as shown) or which can comprise three dimensional electrodes/e.g. crossed paraboloids, hyperboloids, etc./and which can be provided in patterned networks, variously/e.g. parallel, concentric, etc./ oriented multiple electrode layers, etc.] and peripheral (side wall) electrodes (1520) [which can be provided on a cylindrical surface in a patterned network with conducting lines]. Information can be provided to a controller (not shown) upon a desired direction wherein the controller can choose the liquid crystal active lens (1500) to direct light (not shown, e.g. coming perpendicularly from the page] in a desired direction [e.g. in Y axis and/or X axis directions] by applying voltage between chosen electrodes (1510, 1520) to orient liquid crystals (1502). The shown set can be used for devices with a dual position liquid crystal display.

Figure 73:
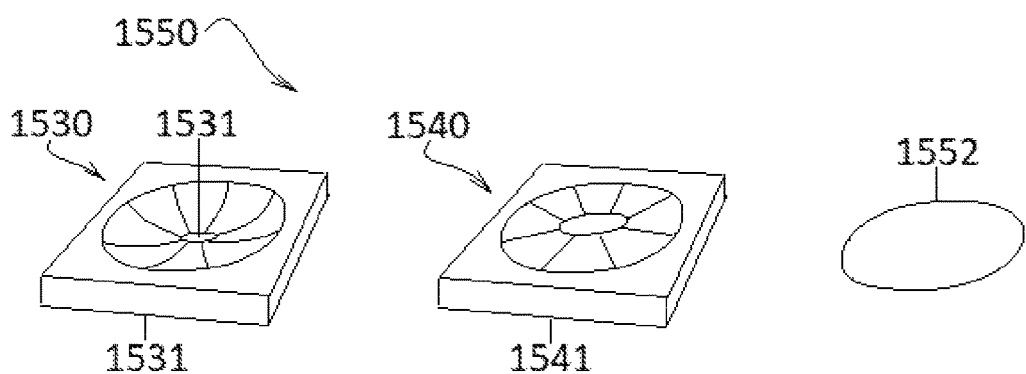
FIG. 73 is a perspective view of another embodiment of a liquid crystal active lens according to the present invention comprising three-dimensional electrodes and an illustration of a fabrication process.

FIG. 73 is a perspective view of top electrode layers (1530) [which can comprise central and peripheral three-dimensional electrodes], bottom electrode layers (1540) [which can comprise central and peripheral electrodes] of another embodiment of a liquid crystal active lens (1550) according to the present invention and an illustration of a fabrication process [e.g. the layers (1530, 1540) can be provided on a suitable transparent polymer substrates (1531, 1541), and electrodes from a transparent material can be deposed on insulating layers which can after assembly form a cavity to be filled/e.g. by an orifice (1531)/with a liquid crystalline material (1552)].

Figure 74:
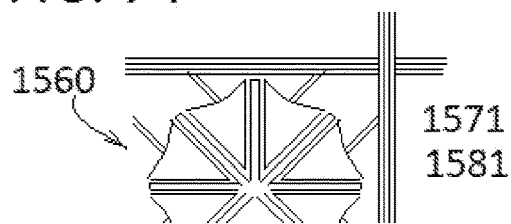
FIG. 74 is a schematic plan view of an electrode layer of a liquid crystal active lens according to the present invention.

FIG. 74 is a schematic plan view of an electrode layer (1560) [which can be a bottom electrode layer] suitable for the present invention which can comprise peripheral electrodes (1570) [which can be connected to a plurality of conductive lines (1571, 1581)].

Figure 75:
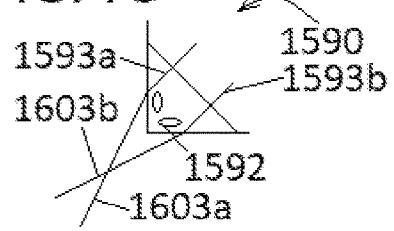
FIG. 75 is a schematic diagram of light refraction in a liquid crystal active lens according to the present invention.

FIG. 75 is a schematic diagram of light refraction in a liquid crystal active lens according to the present invention. Light (1593*a*, 1593*b*) [e.g. coming from a left-eye pixel and a right-eye pixel] can be split into two directions (1603*a*, 1603*b*) which can be enabled by positioning liquid crystals (1592) in a liquid crystal active lens (1590) and directed in a desired direction. The shown set can be used for devices with a dual position liquid crystal display.

Figure 76:
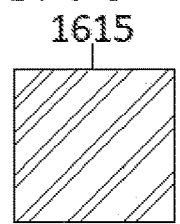
FIG. 76 is a schematic plan view of a diagonal polarizer for a liquid crystal display for stereovision according to the present invention.

FIG. 76 is a schematic plan view of a diagonal polarizer (1615) for a liquid crystal display (not shown) for stereovision according to the present invention.

Figure 77:
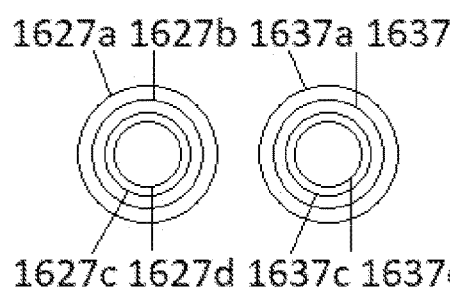
FIG. 77 is a schematic diagram of vantage zones provided by a liquid crystal display for stereovision according to the present invention.

FIG. 77 is a schematic diagram of vantage zones (1627*a*, 1627*b*, 1627*c*, 1627*d* and 1637*a*, 1637*b*, 1637*c*, 1637*d*) which can correspond to a viewer's eyes (not shown). [Depending upon mainly a distance of a viewer from a liquid crystal for stereovision there can be various vantage zones which can be represented by concentric circles round viewer's right and left eye. Smaller circle diametres can be convenient for greater distances and larger diametres for smaller distances. It can be important to provide the vantage zones to prevent interferences between viewer's right and left eyes so that a left-eye image and a right-eye image interception remain clearly divided.]

Figure 78:
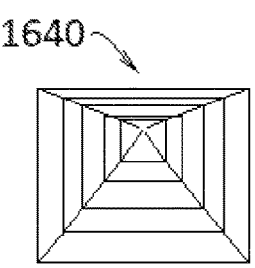
FIG. 78 is an oblique view of a three dimensional electrode layer for a liquid crystal active lens according to the present invention.
Figure 81:
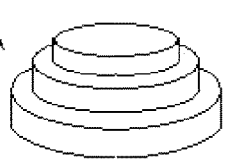
FIG. 81 is a perspective view of a three dimensional electrode layer for a liquid crystal active lens according to the present invention.

FIG. 78 is an oblique view of a three dimensional electrode layer (1640) [which can be a top layer] which can have a pyramidal form [the pyramid can be gradual similarly as shown in FIG. 81]. The electrode layer (1640) can enable a four-sided light control.

Figure 79:
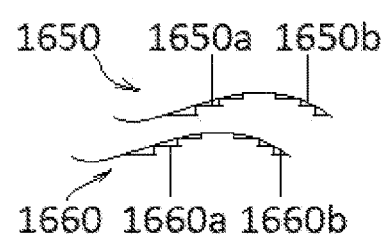
FIG. 79 is a schematic oblique view of electrode layers for liquid crystal active lenses according to the present invention.

FIG. 79 is a schematic oblique view of electrode layers (1650, 1660) [which can have a gradual profile (1650*a*, 1660*a*) or a smooth profile (1650*b*, 1660*b*)].

Figure 80:
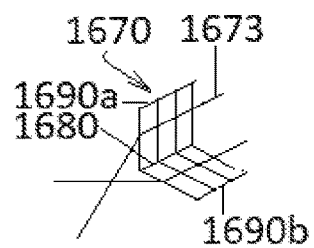
FIG. 80 is a schematic cross sectional view of light refraction in a liquid crystal active lens according to the present invention.

FIG. 80 is a schematic cross sectional view of refraction of a linearly polarized light (1673) in a liquid crystal active lens (1670) by providing voltages between a central electrode layer (1680) and peripheral electrode layers (1690*a*, 1690*b*).

FIG. 81 is a perspective view of a three dimensional electrode layer (1680) [which can have a gradually conical form or a conical form (not shown)] for a liquid crystal active lens according to the present invention.

Figure 82:
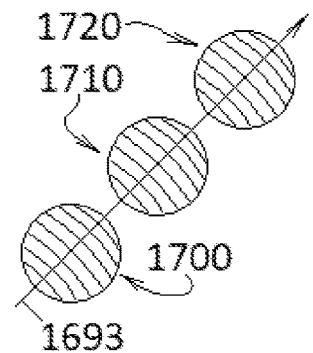
FIG. 82 is a perspective illustration of three liquid crystal active lenses providing two axis light refraction and rotation of the direction of polarization.

FIG. 82 is a perspective illustration of three liquid crystal active lenses (1700, 1710, 1720) wherein the first lens (1700) can provide refraction of a [e.g. vertically] polarized light (1693) in a first direction [e.g. a vertical direction], the second lens (1710) can rotate the direction of polarization into a horizontal direction or a diagonal direction], the third lens (1720) can provide refraction of the [e.g. horizontally or diagonally] polarized light (1693) into a second direction [e.g. into a horizontal direction or a diagonal direction]. The above described function of the three active lenses (1700, 1710, 1720) can be provided in one active lens [e.g. in a form of the liquid crystal active lens (560) as shown in FIG. 23 where the bottom part of the light tunnel (561) can provide refraction in a first direction, the central part can provide twist of polarization direction and the upper part can provide refraction in a second direction.] Thus light (1693) [e.g. coming from one pixel or subpixel] can be directed into any desired direction. The shown set [or in-one provided] can be used for devices with a dual position liquid crystal display [e.g. a smartphone]. For a single position liquid crystal display [e.g. a television] refraction in one direction [e.g. horizontal] can be sufficient to form left-eye and right-eye panels [e.g. as shown in FIG. 2] which can each comprise liquid crystal active lenses according to the present invention.

Common features of FIGS. 1 to 82

Although exemplary embodiments are described in association with liquid crystal display (LCD) technology, it is contemplated that exemplary embodiments are applicable to other display technology, such as one or more self-emissive or non-self-emissive display technology. e.g., cathode ray tubes (CRTs), electrophoretic displays (EPDs), electrowetting displays (EWs), plasma display panels (PDPs), organic light emitting diodes (OLEDs), field emission displays (FEDs), and/or the like.

The microlens produced is tuned by applying an electric field. The applied electric field changes the orientation of the liquid crystal director. In the absence on an external electric field, the liquid crystal directors are randomly oriented, causing light to scatter. When a voltage is applied across the liquid crystal micro-droplet, the liquid crystal directors tend to align toward the field of direction, i.e., along the droplet curvature near the surface, and tend to become straight near the center. The curvature of the liquid crystal alignment may be altered by the electric field applied, which in turn guides the incoming light waves to converge to a focal point. In this manner, the focal length can be tuned by controlling the applied voltage.

The liquid crystals utilized in the microlens array of the present invention may be nematic liquid crystals, cholesteric liquid crystals, smectic liquid crystals, ferro-electric liquid crystals, or antiferro-electric liquid crystals, and mixtures thereof. Liquid crystal material can be conventional polymer network liquid crystal.

Nematic LC, and Smectic C* or Smectic A*, could be utilized, in either a homeotropic or homogeneous alignment. Nematic gels, nematics with a polymer network (i.e., the liquid crystal itself is a cross-linkable polymer), or any nematic liquid crystal with either a positive dielectric constant or a negative dielectric constant or a mixture of each, polymer dispersed liquid crystal material. Smectic A* and C* liquid crystal material, discotic liquid crystal material, cholesteric liquid crystal material such as ferroelectrics and surface stabilized ferroelectrics, or dual-frequency liquid crystal material can be used. The liquid crystal material can also be a high viscosity material, or be doped with larger molecular weight materials to increase the viscosity. The liquid crystal material can possess any number of a variety of crystal symmetries, for example uniaxial, biaxial, or others. The "short" and "long" or "longitudinal axes" can also refer in general to the liquid crystal director orientation. Nematic liquid crystal can have a positive dielectric anisotropy, it is understood that embodiments of the present invention may utilize other types of liquid crystal material.

The longitudinal axis may also be referred to as the director. It is further understood that the longitudinal axes for different liquid crystal molecules may not be precisely aligned with one another, but rather encompass a distribution. Further, the distribution of orientations for the longitudinal axes may change for different regions within the liquid crystal layer. Hence, the orientation of the longitudinal axis for liquid crystal molecules and how they are altered under the application of voltages may refer to a general distribution of orientations of a plurality of molecules as well.

Polymerizable material can be photopolymerizable single, multi-functional monomers and oligomers, acrylates, methacrylates, thiols, alkyl ethers, aromatic analogs and mixtures thereof.

The size and number of liquid crystal microdroplets can be controlled. The droplet size may range from about 30 nanometers to about 300 micrometers. The number of microdroplets may vary from about 100×100 to about 10,000×10,000.

The droplets can have various arrangements, morphological patterns, etc.

Transparent substrates are typically used, and examples thereof include glass and plastic [e.g. polycarbonate, acrylic plastic, etc.]. A flexible ITO coated polymeric films may be used to arrange the arrays of the LC microlens in a convenient shape (e.g. asphere, convex, concave, cylindric, etc.).

The proposed pinhole effect is an optical concept suggesting that the smaller the pupil size, the less defocus from spherical aberrations is present. When light passes through a small pinhole or pupil, all unfocused rays are blocked, leaving only focused light to land on the retina to form a clear image.

Preferably, an electrode layer is positioned on the inside surfaces of the substrates. Any suitable electrode can be used, such as indium-tin-oxide (ITO) layer which is a transparent electrode or aluminium zinc oxide (AZO), gallium zinc oxide (GZO), indium zinc oxide (IZO), etc. Concentric electrodes can distribute the voltage across the active area homogenously. The diameter of circle electrodes (or other shapes, e.g. polygons, polyhedrons, etc.) and space between electrodes can be an important parameter in order to obtain convenient voltage profiles in the area and e.g. to avoid steep voltages. Various voltage profiles can be obtained modifying shapes of electrodes. Shapes, curvatures, spacing, size of lenses can improve image quality, expand viewing angle and eliminate unwanted image artifacts. Lenses with convenient phase profiles can be aberration-free. There is no need to highly concentrate electrodes in central regions of lenses. Convenient voltages can be used, e.g. avoiding too low (which can cause a bubble effect) or too high voltages. Each liquid crystal lens can be controlled by separate voltages supplied by a driver circuit (which can include left-eye and right-eye circuits) which can be controlled by a sensor processor which can receive an output of a viewer's (eyes) position sensor(s). The sensor processor can operate through an algorithm to adjust a voltage of the driving circuit. The operator (viewer) can control the system by an external controller which can provide its signal to the image sensor processor. The viewer can for example adjust number of viewers, preferred mode (e.g. consecutive saturating process as shown in FIGS. 15a and 15b), viewer's eye distance (which can be measured by the system), parameters of viewing zone(s), sensitivity of a viewer position sensor, etc. The system can (automatically) switch and distribute left-eye/right eye liquid crystal panels in according with number of viewers and orientation of a particular display.

The shape of the electrodes can be generally rectangular, square, parallelogram, round, polygon or polyhedron or other shapes.

Insulating layers may be made of inorganic insulating materials [e.g. silicon nitride (SiNx), silicon oxide (SiOx), titanium oxide ($TiO_2$), alumina ($Al_2O_3$), zirconia ($ZrO_2$), etc.] or organic materials [e.g. poly siloxane, phenyl siloxane, polyimide, silsesquioxane, silane, etc.].

Optionally, an alignment layer may be disposed over the electrode layer. Any alignment layer may be used that does not interfere with the results obtained by the present invention. E.g. the alignment layer can be from an organic material such as polyimide or a inorganic material such as silicon dioxide. Each of the electrode layers can be connected to one terminal of a power supply by leads. By varying an applied voltage to the electrode layers, the refractive index of the liquid crystals can be varied. The power supply can adjust the voltages across electrodes sandwiching, (partially) surrounding the liquid crystal (LC) lenses separately. A signal processor can iteratively adjust the voltage applied across the two electrodes.

The electrically focusable microlens are particularly useful when the viewer's eyes are not in a fixed position.

The outer shape of each lens may conform to the shape and size of the pair of pixels behind it, e.g., a rectangular lens for a pair of rectangular pixels, but it is not required to do so. The lenses can be smaller or bigger than corresponding pixels. Depending on the parameters chosen for the different lenses, they can have different outer shapes to allow them to remain close to each other and minimize dead space between adjacent lenses or to satisfy other requirements (e.g., to facilitate manufacturing).

Alignment layer may be provided to initially align or bias the orientation of liquid crystal material that is adjacent to or proximate to the alignment layer in the active lenses. One or more alignment layers can be used. By providing the alignment layer, the liquid crystal material responds to an applied voltage in a faster and more orderly and predictable manner. Liquid crystals can be aligned without applied voltage in a parallel manner, perpendicularly, under an angle, in X-axis or Y-axis direction, etc. The alignment of the liquid crystal between the alignment layers can be anti-parallel, parallel, twisted, or hybrid. The direction of liquid crystal alignment can be at any angle with respect to the direction of light propagation. When no voltage is applied to the liquid crystal material, the alignment layer can provide sufficient liquid crystal ordering (e.g. to a central viewer's position in front of a screen in a defined distance). Alignment layers can be generally transparent.

No limitations are intended others than as described in the claims. The present invention is not limited to the described exemplary embodiments. It should be noted that various modifications of the proposed system for stereovision can be made without departing from the scope of the invention as defined by the claims.

Elements, integers or components having known equivalents thereof are herein incorporated as if individually set forth.

The elements, integers, components, materials, techniques, etc., described in this specification reflect the state of knowledge at the time of the filling of this application and may be developed in the future.

INDUSTRIAL APPLICABILITY

The present invention can be useful for devices using LCD (cameras, video, televisions, computers, mobile phones, imaging/e.g. medical/devices, etc.).

3D LCDs according to the present invention can be rotated and provide a 3D image in indefinite display viewing positions (vertically and horizontally oriented, rotated, slanted, etc.).

A device equipped with the proposed 3D LCD can provide eye-tracking, individual settings and a continuous 3D viewing from varying viewer's eyes positions (parallel to the 3D LCD) and distances from the 3D LCD. Head movements are allowed to retain a 3D.

The proposed system can offer a single-viewer 3D television and/or multiple-viewers 3D television, or monovision.

The light being individually 3D concentrated, the system propose a bright image. The system propose less sensitivity to lenses misalignment.

The system proposes switching between 2D and 3D modes and 3-D viewing of both dynamic and static pictures.

The system proposes personal settings and options.

I claim:

1. A liquid crystal display (LCD) system for stereovision, comprising: a left-eye liquid crystal panel; a right-eye liquid crystal panel; a left-eye circuit controlling said left-eye liquid crystal panel; a right-eye circuit controlling said right-eye liquid crystal panel; wherein said left-eye liquid crystal panel is to be oriented substantially vertically when viewed and oriented towards a left eye of a viewer and wherein said right-eye liquid crystal panel is to be oriented substantially vertically when viewed and oriented towards a right eye of said viewer, wherein said left-eye liquid crystal panel and/or said right-eye liquid crystal panel comprise one or more liquid crystal active lenses.

2. The LCD system according to claim 1, wherein said one or more liquid crystal active lenses comprise a curved alignment layer.

3. The LCD system according to claim 1, wherein said one or more liquid crystal active lenses comprise at least a first and a second plurality of electrodes, wherein voltage provided between electrodes of said first and said second plurality of electrodes makes liquid crystals comprised in said liquid crystal lenses to get oriented in one or more desired directions.

4. The LCD system according to claim 1, wherein said one or more liquid crystal active lenses comprise a central electrode and/or a peripheral electrode and/or a side wall electrode.

5. The LCD system according to claim 1, wherein said one or more liquid crystal active lenses comprise at least one three-dimensional electrode.

6. The LCD system according to claim 5, wherein said at least one three-dimensional electrode is asphere.

7. The LCD system according to claim 1, wherein said one or more liquid crystal active lenses provide one or more vantage zones.

8. The LCD system according to claim 1, wherein said one or more liquid crystal active lenses have at least partially cylindrical or prismatic shape.

9. The LCD system according to claim 1, wherein said LCD system provides stereovision in at least two substantially perpendicular vision positions.

10. The LCD system according to claim 1, wherein said left-eye liquid crystal panel and/or said right-eye liquid crystal panel provide monovision.

11. The LCD system according to claim 1, wherein said LCD system comprises a viewer position sensor.

12. The LCD system according to claim 1, wherein said LCD system is flexible at least in one direction.

13. The LCD system according to claim 1, wherein said LCD system comprises diagonally arranged pixel and/or subpixel routes and/or wherein said LCD system provides substantially diagonally polarized light.

14. The LCD system according to claim 1, wherein said left-eye liquid crystal panel and/or said right-eye liquid crystal panel include one or more light tunnels and wherein said left-eye circuit and/or said right-eye circuit are configured to be able to pick up any said light tunnel and to direct light towards any of said left eye or said right eye.

15. The LCD system according to claim 1, wherein said left-eye liquid crystal panel and said right-eye liquid crystal panel are included in one liquid crystal panel.

16. The LCD system according to claim 1, wherein said left-eye circuit and said right-eye circuit are included in one driver circuit.

17. The LCD system according to claim 1, wherein said left-eye liquid crystal panel and/or said right-eye liquid crystal panel comprise one or more pixel route columns.

* * * * *